United States Patent [19]

Miranti, Jr.

[11] Patent Number: 4,610,648
[45] Date of Patent: Sep. 9, 1986

[54] BELT CONSTRUCTION FOR A CONTINUOUSLY VARIABLE TRANSMISSION, TRANSVERSE BELT ELEMENT THEREFOR AND METHODS OF MAKING THE SAME

[75] Inventor: Joseph P. Miranti, Jr., Porter Township, Mo.

[73] Assignee: Dayco Corporation, Dayton, Ohio

[21] Appl. No.: 547,272

[22] Filed: Oct. 31, 1983

[51] Int. Cl.[4] .............................................. F16G 1/21
[52] U.S. Cl. .................................................... 474/242
[58] Field of Search ........................ 474/201, 242, 244

[56] References Cited

U.S. PATENT DOCUMENTS 2,528,244 10/1950 Rawson ................................. 74/217
4,080,841 3/1978 Vollers ................................. 474/201
4,303,403 12/1981 Lamers ................................. 474/201

FOREIGN PATENT DOCUMENTS 58-8152 5/1983 Japan ................................... 474/201

OTHER PUBLICATIONS

Copending Patent Application, Ser. No. 501,357, filed Jun. 6, 1983 -Miranti, Jr. et al.

Primary Examiner—James A. Leppink
Assistant Examiner—Frank Mc Kenzie
Attorney, Agent, or Firm—Joseph V. Tassone

[57] ABSTRACT

A belt construction for a continuously variable transmission, a transverse belt element therefor and methods of making the same are provided, the belt construction having an endless flexible band unit and a plurality of belt elements carried by the band unit in sliding relation therewith. Each belt element has a slot arrangement receiving the band unit therein and has opposed faces disposed in compressed relation against adjacent faces of adjacent belt elements. Each belt element has opposed sides for respectively engaging pulley faces of the transmission, the slot arrangement for each belt element defining a pair of slots respectively interrupting the opposed sides thereof and being spaced from each other by a central stem portion of the element. The pair of slots for each element receive parts of the band unit therein and respectively define a pair of shoulders engaging the parts of the band unit. Each shoulder of each belt element has a transverse surface provided with an apex that engages its respective part of the band unit, the apex being disposed between its respective center of its surface and its respective stem so as to tend to bias its respective part of the band unit toward its respective central stem rather than towards its respective side.

60 Claims, 18 Drawing Figures

BELT CONSTRUCTION FOR A CONTINUOUSLY VARIABLE TRANSMISSION, TRANSVERSE BELT ELEMENT THEREFOR AND METHODS OF MAKING THE SAME

BACKGROUND OF THE INVENTION

1. Field of the Invention

This invention relates to an improved endless power transmission belt construction for a continuously variable transmission and to a transverse belt element therefor as well as to methods of making the belt construction and the belt element.

2. Prior Art Statement

It is known to applicant to provide a belt construction for a continuously variable transmission, the belt construction having an endless flexible band means and a plurality of belt elements carried by the band means in sliding relation therewith. Each belt element has slot means receiving the band means therein and has opposed faces disposed in compressed relation against adjacent faces of adjacent belt elements. Each belt element has opposed sides for respectively engaging pulley faces of the transmission, the slot means for each belt element defining a pair of slots respectively interrupting the opposed sides thereof and being spaced from each other by a central stem portion of the element. The pair of slots for each element receive parts of the band means therein and respectively define a pair of shoulders engaging the parts of the band means, each shoulder of each belt element having a transverse surface provided with an apex that engages its respective part of the band means. The apex of each transverse surface of its respective belt element is offset relative to the center between its respective side and its respective central stem to tend to bias its respective part of the band means toward its respective central stem rather than toward its respective side. For example, see the copending patent application, Ser. No. 501,357, filed June 6, 1983 now U.S. Pat. No. 4,533,342, of Joseph P. Miranti, Jr. et al wherein the apex of each transverse surface of each belt element is disposed closer to its respective side than to its respective central stem.

It is also known to provide a belt construction for a continuously variable transmission, the belt construction having an endless flexible band means and a plurality of belt elements carried by the band means in sliding relation therewith. Each belt element has at least one slot means receiving at least part of the band means therein and has opposed faces disposed in compressed relation against adjacent faces of adjacent belt elements. Each belt element has opposed sides for respectively engaging pulley faces of the transmission. The slot means for each element defines a shoulder engaging the part of the band means, the shoulder of each belt element having a transverse surface that has at least a portion that engages its respective part of the band means from substantially one end of the portion to substantially the other end thereof. For example, see the U.S. Patent to Lamers, U.S. Pat. No. 4,303,403 wherein the portion of the transverse surface of each belt element is substantially straight and substantially horizontal.

SUMMARY OF THE INVENTION

It is one feature of this invention to provide an improved belt construction for a continuously variable transmission wherein each belt element tends to bias its respective part of the band means toward its respective central stem rather than toward its respective pulley face of the transmission.

In particular, it is believed according to the teachings of this invention that if the band means can be prevented from engaging against the pulley faces during the operation of the continuously variable transmission, wear out of the pulley faces by such band means will be prevented.

Accordingly, it is believed that the apex of each transverse surface of the respective belt element of this invention should be disposed between its respective center of its surface and its respective stem. In this manner, it is believed that the resulting transverse surface will tend to bias its respective part of the band means toward the central stem rather than toward its respective side.

For example, one embodiment of this invention provides a belt construction for a continuously variable transmission, the belt construction having an endless flexible band means and a plurality of belt elements carried by the band means in sliding relation therewith. Each belt element has slot means receiving the band means therein and has opposed faces disposed in compressed relation against adjacent faces of adjacent belt elements. Each belt element has opposed sides for respectively engaging pulley faces of the transmission, the slot means for each belt element defining a pair of slots respectively interrupting the opposed sides thereof and being spaced from each other by a central stem portion of the element. The pair of slots for each belt element receive parts of the band means therein and respectively define a pair of shoulders engaging the parts of the band means, each shoulder of each belt element having a transverse surface provided with an apex that engages its respective part of the band means. The apex of each transverse surface of its respective belt element is offset relative to the center between its respective side and its respective central stem to tend to bias its respective part of the band means toward its respective central stem rather than toward its respective side. The apex of each transverse surface of each belt element is disposed between its respective center and its respective stem.

It is another feature of this invention to provide an improved belt construction for a continuously variable transmission wherein each belt element tends to bias its respective part of the band means to a position that will prevent that part of the band means from moving in a lateral direction away from the intended direction of bias thereof.

In particular, it is believed that if the engaging portion of the transverse surface of the belt element is formed to be progressively higher as it extends from one of the ends of that portion to the other end thereof, the engaged part of the band means will be biased in a direction toward the higher part of the portion of the belt element to prevent that part of the band means from moving in the reverse direction.

For example, one embodiment of this invention provides a belt construction for a continuously variable transmission, the belt construction having an endless flexible band means and a plurality of belt elements carried by the band means in sliding relation therewith. Each belt element has at least one slot means receiving at least part of the band means therein and having opposed faces disposed in compressed relation against adjacent faces of adjacent belt elements, each belt element having opposed sides for respectively engaging pulley faces of the transmission. The slot means for each element defines a shoulder engaging the part of the band means, the shoulder of each belt element having a transverse surface that has at least a portion thereof that engages its respective part of the band means from substantially one end of the portion to substantially the other end thereof. The portion of each transverse surface of its respective belt element is disposed progressively higher as it extends from one of said ends thereof to the other end thereof whereby the other end of each portion comprises the apex of that portion.

Accordingly, it is an object of this invention to provide an improved belt construction for a continuously variable transmission, the belt construction of this invention having one or more of the novel features of this invention as set forth above or hereinafter shown or described.

Another object of this invention is to provide a method of making such a belt construction, the method of this invention having one or more of the novel features of this invention as set forth above or hereinafter shown or described.

Another object of this invention is to provide an improved belt element for such a belt construction, the belt element of this invention having one or more of the novel features of this invention as set forth above or hereinafter shown or described.

Another object of this invention is to provide an improved method of making such a belt element, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
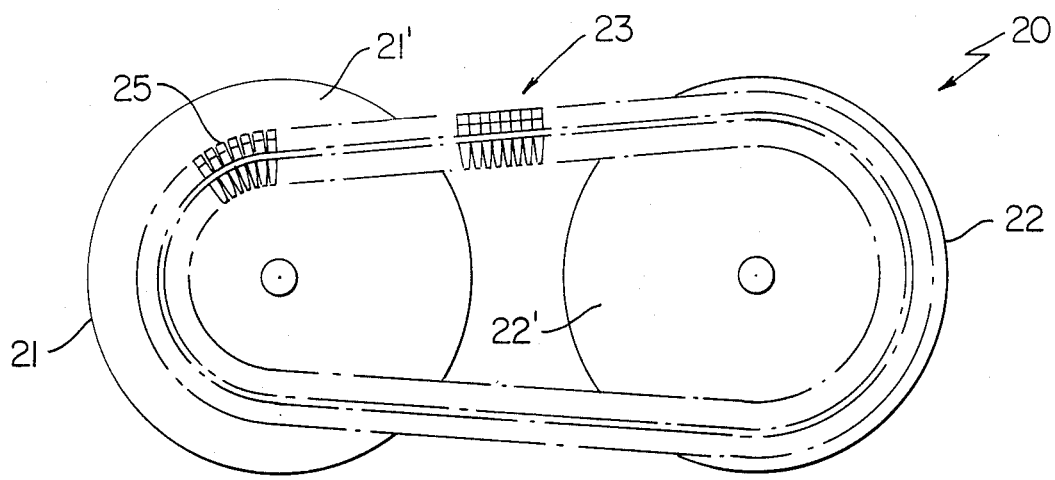
FIG. 1 is a schematic side view of a continuously variable transmission means with parts in section, the transmission means including the improved belt construction of this invention.

While the various features of this invention are hereinafter illustrated and described as providing a belt construction particularly adapted to be utilized for continuously variable transmission purposes, it is to be understood that the various features of this invention can be utilized singly or in any combination thereof to provide a belt construction for other uses as desired, such as for driving accessories for an engine of a transportation vehicle. Also, such belt construction can be utilized in place of other conventional belts, as desired.

Therefore, this invention is not to be limited to only the embodiments illustrated in the drawings, because the drawings are merely utilized to illustrate some of the wide variety of uses of this invention.

Referring now to FIG. 1, a conventional continuously variable transmission arrangement is generally indicated by the reference numeral 20 and comprises a pair of rotatable pulleys 21 and 22 one of which is to be driven by the other thereof by means of an endless power transmission belt construction of this invention that is generally indicated by the reference numeral 23 and which operates, in general, in a manner conventional in the art, the pulleys 21 and 22 having variable diameters in a manner well known in the art whereby a continuously variable transmission is provided by the arrangement 20 in a manner well known in the art and as set forth in five U.S. Pat. Nos. 3,720,113; 4,080,841; 4,299,586; 4,303,403 and 4,338,081 and a published United Kingdom Patent application No. GB 2,088,018A whereby these five patents and patent application are being incorporated into this disclosure by this reference thereto.

Since the operation of a continuously variable power transmission arrangement is well known in the art, a further description of the arrangement 20 need not be set forth as the features of this invention will be directed to the endless power transmission belt construction 23 which will be hereinafter described.

However, it is to be understood that the arrangement 20 could operate in an externally lubricated environment as is conventional with all metal belt constructions for continuously variable transmission systems or can operate in a non-lubricated environment as will be apparent hereinafter.

Figure 2:
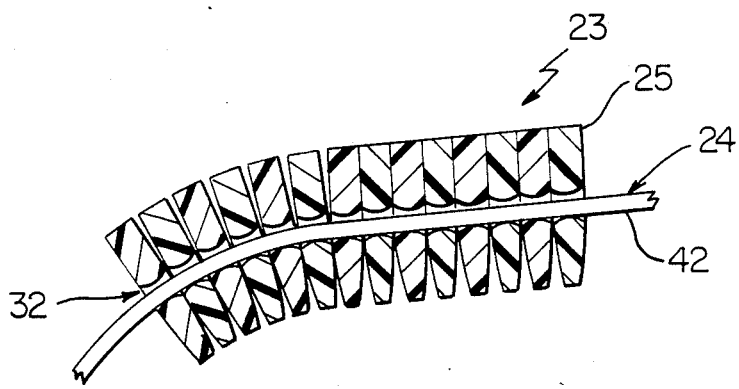
FIG. 2 is an enlarged cross-sectional view of a portion of the belt construction of FIG. 1.

The endless belt construction 23 of this invention comprises an endless flexible band means or tensile means that is generally indicated by the reference numeral 24, FIGS. 2 and 3, and a plurality of transverse belt elements 25 carried by the carrier means or band means 24 in a manner hereinafter set forth.

The flexible band means 24 actually comprises a pair of band means 24' disposed and held in spaced apart parallel relation by the belt elements 25 in a manner hereinafter set forth, each band means 24' being formed from a single endless element or a plurality of endless elements as is conventional in continuously variable transmission systems whereby the band means 24' are merely illustrated schematically as being formed from a single layer of metallic material with the understanding that the same can be formed from a plurality of layers in a conventional manner and of other materials or combination of materials as desired.

Figure 4:
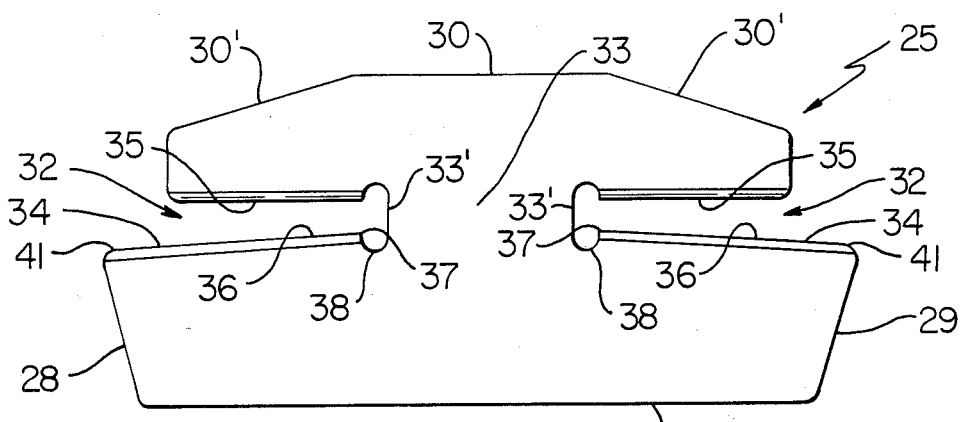
FIG. 4 is an enlarged front view of one of the transverse belt elements of the belt construction of FIGS. 1-3 before the same is assembled to the flexible band means of the belt construction of FIGS. 1-3.

Each transverse belt element 25 of this invention is substantially trapezoidal in configuration when viewed in the manner illustrated in FIG. 4 and has opposed front and rear faces 26 an 27 as well as opposed side faces 28 and 29 with the side faces 28 and 29 being angled relative to each other to give a substantially "V" shape to each belt element 25 and to engage the angled pulley faces 21' and 22' of the pulleys 21 and 22 in a conventional manner.

Each belt element 25 also has a top face or side 30 and a bottom face or side 31 which are disposed substantially parallel to each other and are substantially flat as illustrated. If desired, the top surface or face 30 can have angled opposed ends 30' as illustrated in FIG. 4.

The opposed front and rear faces 26 and 27 of each belt element 25 have upper portions 26' and 27' that are disposed substantially parallel to each other and lower portions 26" and 27" which respectively taper toward each other as they approach the bottom surface 31.

Each side face 28 and 29 is interrupted by a slot 32 which is disposed spaced from the other slot 32 so as to define a central stem portion 33 of the belt element 25 therebetween, each slot 32 defining a lower shoulder 34 that will engage part of the inside surface of the band means 24 as will be apparent hereinafter. Each slot 32 also defines an upper shoulder 35 which is normally spaced from the top surface of the band means 24. Each shoulder 34 of the belt element 25 defines a transverse substantially straight surface 36 which is uniquely constructed and angled so that the same has the apex or higher portion 37 thereof disposed closely adjacent the side 33' of the respective slot 32 so as to be offset relative to the center of the transverse surface 36 between that center and the adjacent surface 33' of the central stem 33 for a purpose hereinafter set forth.

If desired, the belt element can be provided with stress relief cutouts 38 intermediate the surface 36 and the central stem 33 as illustrated in FIG. 4 and for a purpose well known in the art.

Figure 5:
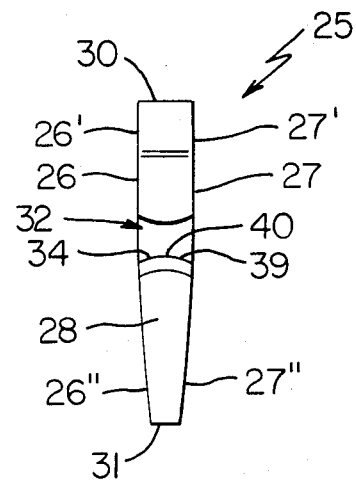
FIG. 5 is a side view of the belt element of FIG. 4.

Each shoulder 34 of the belt element 25 also defines a longitudinal surface 39 as illustrated in FIG. 5 with the apex 40 of the surface 39 being disposed substantially in the center between the opposed front and rear faces 26 and 27 of the belt element 25 as illustrated.

If desired, the compression pitch line for each belt element 25 can be chosen according to the teachings of the invention set forth in the aforementioned copending patent application, Ser. No. 501,357, filed June 6, 1983, so that the required elongation of the band means 24 when all of the elements 25 are carried thereby in the manner illustrated in FIGS. 1 and 2 will be less than 10% of the yield elongation of the band means 24 whereby it can be seen that in the completed belt construction 23, the band means 24 will be under tension while each belt element 25 will be under compression between adjacent faces 26 and 27 of the adjacent elements 25 throughout the entire length of the band means 24. Accordingly, the copending patent application, Ser. No. 501,357, filed June 6, 1983 is being incorporated into this disclosure by this reference thereto.

Figure 3:
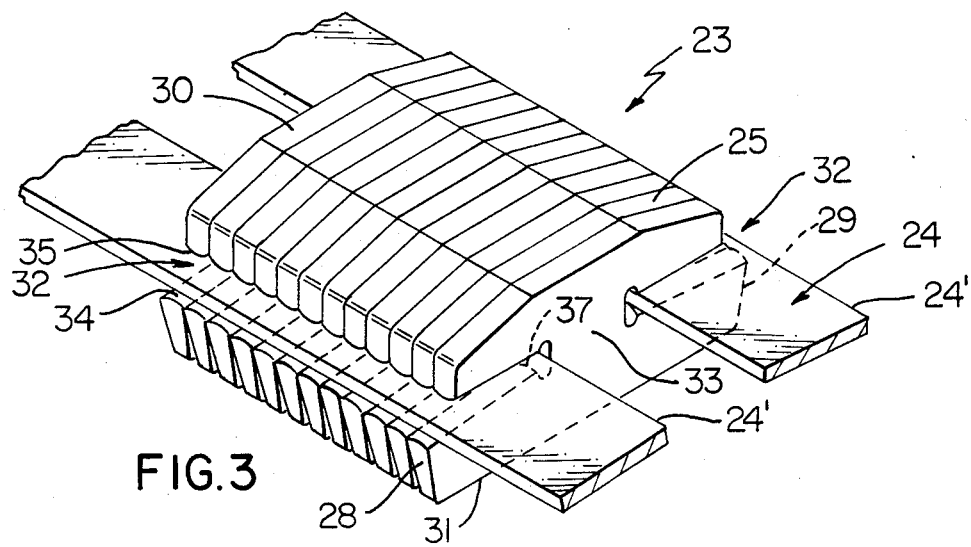
FIG. 3 is a fragmentary perspective view of part of the belt construction of FIG. 2.
Figure 6:
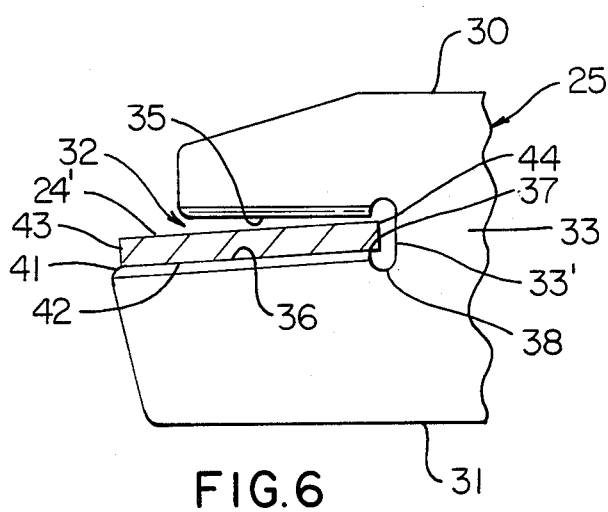
FIG. 6 is a fragmentary view similar to FIG. 4 and illustrates the belt element when assembled to part of the band means of the belt construction of FIGS. 1-3.

When the elements 25 are assembled onto the band parts 24' as illustrated in FIG. 3, by merely having the band parts 24' inserted into the slots 32, it can be seen that the apexes 37 of the transverse surfaces 36 of each element 25, as illustrated in FIG. 6, tend to bias the particular band part 24' toward the central stem 33 of the element 25 rather than toward the respective side 28 or 29 thereof so that the tendency of the band means 24' to engage against the pulley faces 21' and 22' during the operation of the system 20 is less likely and therefore will not tend to wear out the surfaces 21' and 22' as would be the case if such surfaces 21' and 22' were being utilized as the means for confining the band means 24' in the slots 32 as in the prior known continuously variable transmission arrangements.

Each surface 36 of each belt element 25 has opposed ends 37 and 41 and the apex portion 40 thereof extends in substantially a straight line manner between the ends 37 and 41 and engages against the side 42 of the respective band means 24' throughout substantially the entire transverse length of the band means 24' between the opposed side edges 43 and 44 thereof as illustrated in FIG. 6.

While the band sections 24' are respectively being illustrated as having the outer end edges 43 disposed short of the surfaces 28 and 29 when the elements 25 are assembled thereon in the manner illustrated in FIGS. 3 and 6, it is to be understood that the outer end edges 43 of the band means 24' can extend closely adjacent the surfaces 28 and 29 while still having the inner edge means 44 thereof disposed closely adjacent the central stem portion 33 as illustrated as the angled surfaces 36 tend to bias the band portions 24' toward the central stems 33 during operation of the belt 23 as will be apparent hereinafter.

In any event, it can be seen that it is a relatively simple method of this invention to form the belt elements 25 into the configuration illustrated so that when the same are assembled to and are operating with the band means 24 in the system 20, the movement of the elements 25 relative to the band means 24 as in conventional continuously variable transmission systems can take place and the apexes 37 of the surfaces 36 of the shoulders 34 of each belt element 25 will tend to bias the band sections 24' inwardly toward the central stem portion 33 and thus, away from the pulley faces 21' and 22'.

While it is believed that the elements 25 can be made of any suitable material or combination of materials, the belt elements 25 for the belt construction 23 can be formed substantially solely from a high performance polymeric material that has high heat resistance, high compression modulus, high toughness and high strength as set forth in the aforementioned copending patent application, Ser. No. 501,357, filed June 6, 1983.

For example, such polymeric material can be selected from the group of a polyamide-imide, polyimide, polyphenylene sulfide, nylon-6 or 6/6 or 6/10, aromatic polyamide, polyvinylidene fluoride, polyetheretherketone, polyetherimide, perfluoroalkoxy-modified tetrafluoroethylene, polytetrafluoroethylene, and polyethersulfone, as well as other polymeric materials that meet the above characteristics. For example, the above mentioned polyamide-imide can be purchased from Amoco Chemicals Corporation, under the trademark "TOR-LON."

In addition, while certain of the above polymeric materials are self-lubricating, such polymeric materials can be made self-lubricating or further self-lubricating by being filled with a lubricating filler means. For example, a dry lubricant, such as polytetrafluoroethylene, molybdenum disulfide, graphite or other suitable lubricating filler means can be utilized.

In addition, the polymeric material could be further strengthened by having strengthening or reinforcing filler means disposed therein, such as glass, carbon, etc. and the filler means could be as fibers, powder, etc.

In any event, by providing the aforementioned self-lubricating polymeric material, it is believed that when the belt elements 25 are utilized with the band means 24 in the manner previously set forth, the transmission means 20 need not be operating in a lubricating environment as the same may be operating in air whereby the self-lubricating features of the belt elements 25 will prevent wear and galling of the interacting surfaces, especially between the elements 25 and the contacting sheave faces 21' and 22'.

Of course, the self-lubricating polymeric material previously set forth is not limited to an unlubricated system, because even in lubricated environment, the self-lubricating polymeric material would provide protection for the system if an occasional lubricant-starved environmental condition should exist. Further, such materials would also allow the use of water base hydraulic fluids or glycol-based coolants instead of petroleum-based fluids as required with all metal belt constructions.

It is also believed that the use of the aforementioned polymeric materials for the elements 25 will allow major weight reduction of the system 20 over the previously known metallic systems and may also allow higher belt speeds, since centrifugally-generated tension would be reduced. In addition, it might be found that failure associated hazards are reduced.

Further, adjacent belt elements 25 could each be formed of a different polymeric material for improved performance characteristics therebetween, as desired.

In any event, it can be seen that it is a relatively simple method of this invention to form the belt elements 25 of the aforementioned polymeric material, such as by molding the polymeric material into the desired configuration, whether the desired configuration is as illustrated in FIG. 4 or any other suitable configuration as will be apparent hereinafter.

Also, it is to be understood that the band means 24 of the belt construction 23 of this invention can have polymeric material similar to the polymeric material of the elements 25 forming at least a part thereof, such as by a coating on the surfaces thereof, that would improve the performance of the action not only between the layers of the band means 24, but also between the band means 24 and the elements 25. Of course, the polymeric material of the band means 24 could be a different material from the material of the elements 25 in order to have unique performance characteristics.

It can be seen that each transverse surface 36 of each belt element 25 actually provides a straight line taper along the transverse apex or portion 40 between the ends 41 and 37 of the respective surface 36 with each portion 40 being disposed progressively higher as it extends from the end 41 thereof to the end 37 thereof as illustrated in FIGS. 4 and 6 whereby the end 37 comprises the apex of that portion 40.

It is believed that the taper or surface 36 serves to bias its respective band part 24' firmly toward the center stem 33 of the belt element 25 so as to prevent destructive interference between the pulleys 21 and 22 of the system 20 and the band means 24.

In particular, it is believed that the taper 36 of each belt element 25 functions in much the same manner as a crown to induce higher tension on the end 44 of the respective band means 24' than the tension imposed on the other end 43 thereof which results in a directional bias which forces the band means 24' either solidly against the surface 33' of the central stem 33 of the respective belt element 25 or closely adjacent thereto as illustrated in FIG. 6. Unlike the prior known crown, however, it is believed that the taper 36 of this invention does not have any "neutral point" over which the band means 24' would tend to ride but which instead allows the band means 24' to "seek" a new neutral position when load varies on the band means 24'.

The width and length of each band means 24' might be chosen so as to cause it to ride some distance away from the surfaces 33' of the central stems 33 as illustrated in FIG. 6. This would provide two advantages, namely, it would allow the band means 24' to operate with substantially its entire width supported by the surfaces 26 of the elements 25 (even in the presence of the stress relief 38) and it would compensate for any permanent elongation in the band means 24' by the band means 24' riding further up the tapers 36. Temporary elongation in the band means 24', which may occur when band tension changes, such as in a non-ideal system, is also compensated for in this manner. This compensation for changes in the band length allows the pitch length of the compressive element assembly to remain essentially constant, and thereby maintain full compressive contact throughout the circumference.

The taper 36 of this invention could be chosen by the criteria utilized in designing crowns for flat belt systems wherein total taper equals approximately 1% of the width. This would result in a taper heighth of approximately 0.005 of an inch when the band section 24' has a width of approximately 0.5 of an inch. However, experience has shown that a greater taper causes a more positive directional bias. Therefore, it is believed that the taper should be as large as possible, limited by the yield elongation of the band material, its fatigue limits or by assembly considerations. For example, for most metallic band materials, a realistic upper limit for the taper 36 might be 5% of the band width whereas composite band structures could be higher. The minimum taper is, of course, 0. However, slight imperfections in the band means will cause it to "float" laterally (even in a band means with a natural tendency to "track") and therefore the minimum taper should be greater than 0.

While each band section 24' for the belt construction 23 of this invention can normally define a substantially cylindrical structure before the same is assembled in its respective slot means 32 of the elements 25 so the circle defined by the end 43 is of the same size as the circle defined by the end 44 thereof, it is also possible to use band means which are normally conical in their overall normal shape, i.e., that define a truncated conical section wherein the edges 43 and 44 are parallel to each other but the edge 44 defines a larger circle than the edge 43. It is believed that the normal conical band section configuration will increase its inward bias on the tapered surfaces 36 of the belt elements 25.

Figure 16:
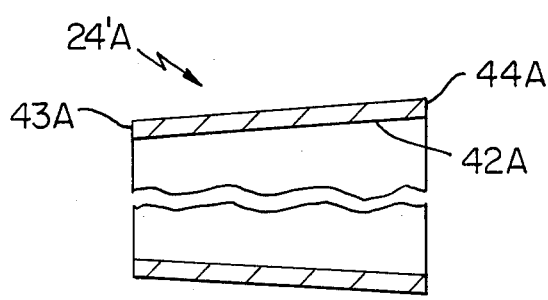
FIG. 16 is a cross-sectional view taken through a looped band means of this invention.

For example, reference is made to FIG. 16 wherein a band section is generally indicated by the reference numeral 24'A and parts thereof similar to the band section 24' previously described are indicated by like reference numerals followed by the reference letter "A".

As illustrated in FIG. 16, the band section 24'A has the inner surface 42A thereof sloping from the smaller edge 43A thereof to the larger edge 44A thereof with the slope 42A either being of the same slope as the cooperating surfaces 36 on the belt elements 25 or being different therefrom as desired. In any event, when the band section 24'A is assembled in the slot means 32 of the belt elements 25, the band section 24'A is placed under longitudinal tension by the elements 25 as well as under radial tension by the surfaces 36. However, the taper of each surface 36 could be designed to be equal to the slope of the surface 42A of the band section 24'A plus a certain percentage of the width thereof. Such a percentage could be 0 if desired. Again, the permissible total taper of each surface 36 of the belt elements 25 is limited by fatigue considerations of the material of the band means 24'A as the longer side 44A of the band 24A is stretched relative to the shorter side 43A thereof.

Also, while the belt element 25 has been illustrated in FIG. 5 as having the arcuate longitudinal surface 39 on each shoulder 34, the same need not have a radius as the importance of such radius merely depends on the thickness of the element 25.

In addition, further modifications can be made in the belt element 25 of this invention and such modifications are respectfully illustrated in FIGS. 7-15 wherein like parts are indicated by like reference numerals followed by the respective reference letter B, C, D, E, F, G, H, I and J as will be apparent hereinafter.

Figure 7:
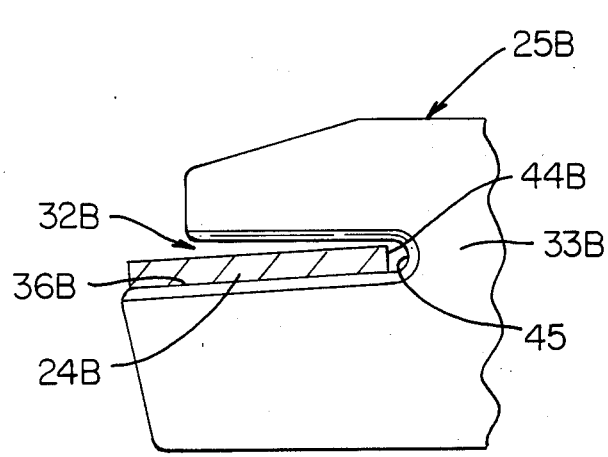
FIG. 7 is a view similar to FIG. 6 and illustrates another belt element of this invention.

As illustrated in FIG. 7, the belt element 25B of this invention is substantially the same as the belt element 25 previously described except that no stress relief cutout 38 is provided at the inner end of the slot means 32B adjacent the central stem 33B wherein the slot means 32B terminates at merely a rounded side 45 of the stem 33B whereby the inner end 44B of the band means 24'B will engage the side 45 if the tapering surface 36B biases the band means 24'B against the same.

Figure 8:
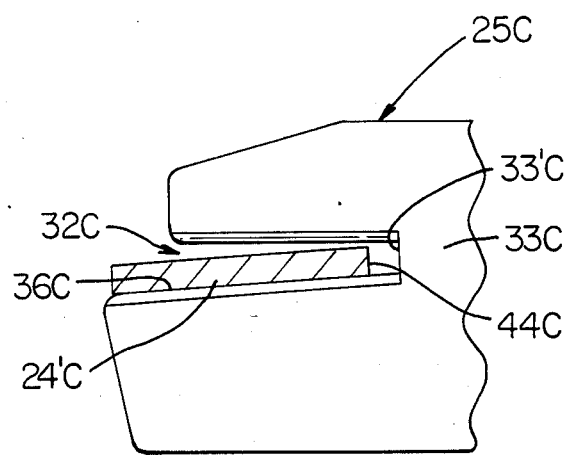
FIG. 8 is a view similar to FIG. 6 and illustrates another belt element of this invention.

If desired, the surface of the central portion 33 of the belt element 25 of this invention can have a configuration which will complement the angle of the end 44 of the band means 24' in the manner illustrated in FIG. 8 wherein the belt element 25C of this invention has the surface 33'C of the central stem 33C thereof angled at the same angle that is presented by the inner edge 44C of the band means 24'C that is disposed in the slot means 32C thereof. In this manner, should the bias provided by the tapering surface 36C cause the band means 24'C to have the inner edge 44C engaged against the surface 33'C of the central stem 33C, such complementing surfaces 44C and 33'C will prevent the band means 24'C from skewing in the slot means 32C thereof.

Of course, other shapes can be provided by the surface 33' of the central stem 33 with or without a stress relief at the inner end of the slot means 32, as desired.

While the belt element 25 of this invention is provided with two slots means 32, it is to be understood that the tapering feature of this invention for biasing the band means in one lateral direction thereof could be utilized where only a single slot means is provided in the belt element.

Figure 9:
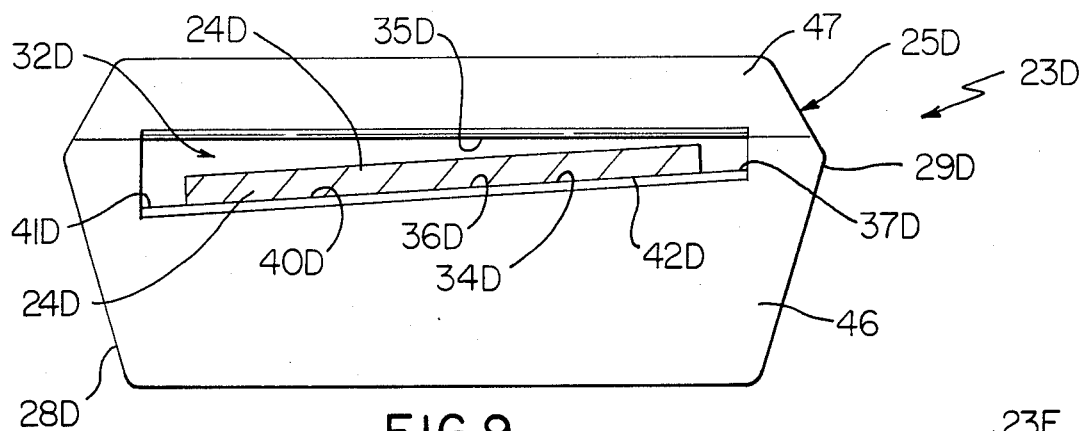
FIG. 9 is a view similar to FIG. 4 and illustrates another belt element of this invention, FIG. 9 illustrating the belt element when assembled to its respective flexible band means.

For example, reference is now made to FIG. 9 wherein another belt element of this invention is generally indicated by the reference numeral 25D and comprises two parts 46 and 47 secured together in any suitable manner after the band means 24D has been disposed so as to be in the resulting central slot means 32D therebetween, the slot means 32D being defined between opposed shoulder means 34D and 35D of the respective parts 46 and 47 as illustrated.

The shoulder 34D on the part 46 of the belt element 25D has the transverse surface 36D that extends from one end 41D thereof to the other end 37D thereof and defines a substantially straight line portion 40D that engages against the undersurface 42D of the band means 24D, the portion 40D progressively being higher as the same extends from the end 41D to the end 37D whereby the end 37D comprises the apex of the surface 36D.

In this manner, the band means 24D would tend to be biased toward the side 29D of the belt elements 25D by the surfaces 36D as the resulting belt construction 23D illustrated in FIG. 9 is operating for the same reasons previously set forth for the transverse surfaces 36 acting on the band sections 24' whereby the band means 24D will tend to be maintained in one lateral position with the slot means 32D in each belt elements 25D rather than tend to move laterally toward the other sides 28D of the belt elements 25D.

Figure 10:
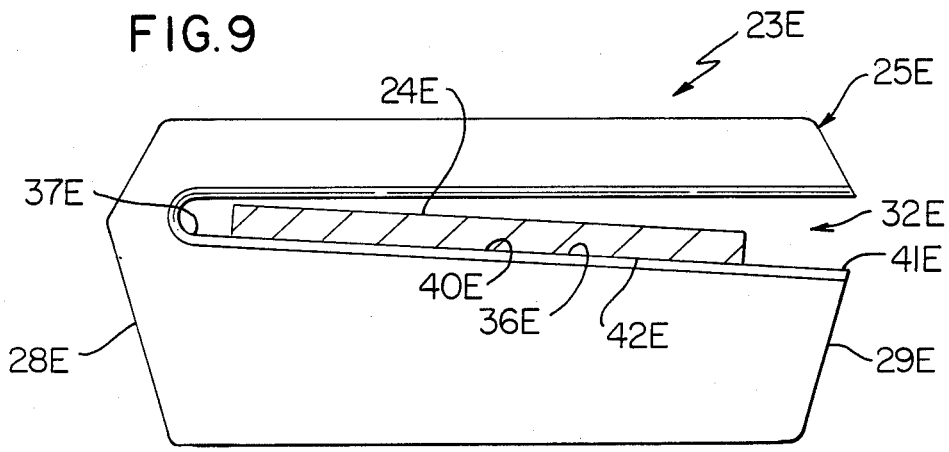
FIG. 10 is a view similar to FIG. 9 and illustrates another belt element of this invention.

Another single slot belt element of this invention is generally indicated by the reference numeral 25E in FIG. 10 and it can be seen that the slot means 32E interrupts the side 29E thereof and extends toward the side 28E thereof with a resulting transverse surface 36D that defines the substantially straight line portion 40E that extends from the lower end 41E thereof adjacent the side 29E to the apex 37E at the other end thereof, the portion 40E engaging against the undersurface 42E of the band means 24E disposed in the slot means 32E whereby the surface 36E biases the band means 24E toward the side 28E during the operation of the resulting belt construction 23E for the same reasons as in the belt construction 23D previously described.

Figure 11:
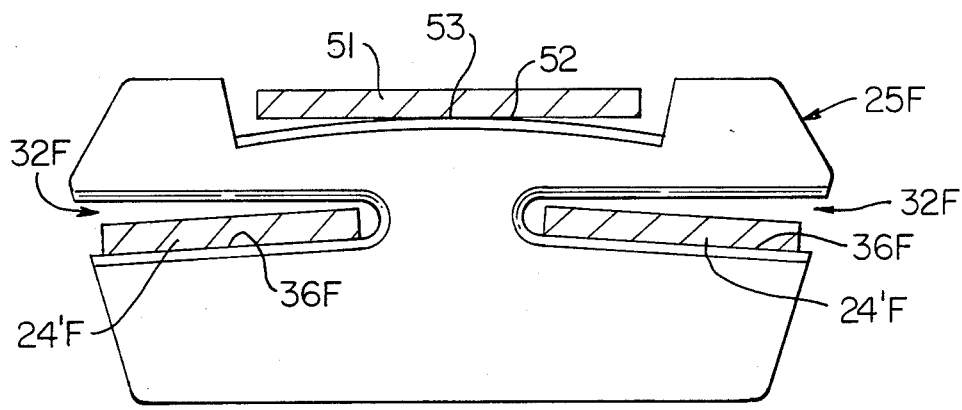
FIG. 11 is a view similar to FIG. 9 and illustrates another belt element of this invention.

As illustrated in FIG. 11, another belt element of this invention is generally indicated by the reference numeral 25F and utilizes the two slot means 32F for the band sections 24'F in the same manner as the slot means 32 previously described. However, the band means 24F includes an additional band portion 51 that engages against a crowned surface 52 formed at the top of the belt element 25E as illustrated in FIG. 11, the crowned surface 52 having an apex 53 in the center thereof to operate on the band means 51 in a conventional manner whereas the transverse surfaces 36F for the slot means 32F are straight line tapers that operate on the band means 24'F in the manner previously described.

Therefore, it can be seen that each improved surface 36 of this invention can provide its function whether the same is utilized by itself, in combination with another surface 36 or in combination with conventional surfaces such as the surface 52 previously described for the belt element 25F.

While each taper 36 of this invention previously described is substantially a straight line or linear taper, it is to be understood that the transverse surface of this invention could be arcuate between the opposed ends thereof with the same progressively being higher as it extends from one end thereof to the other end thereof regardless of whether the arcuate surface is convex or concave and the cooperating band means therefor will conform to such arcuate transverse surface throughout the transverse length thereof so as to be biased toward the higher end thereof.

Figure 12:
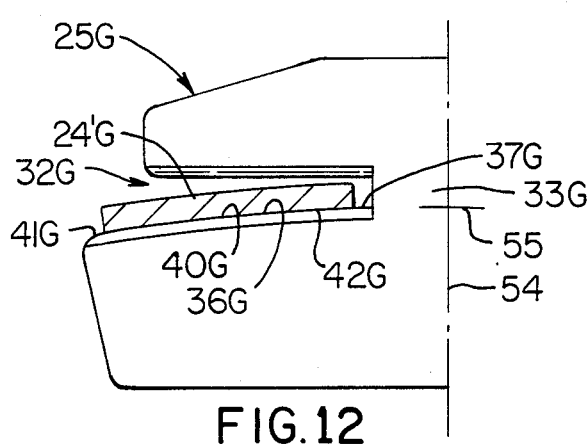
FIG. 12 is a partial view similar to FIG. 9 and illustrates another belt element of this invention.

For example, reference is now made to FIG. 12 wherein another belt element of this invention is generally indicated by the reference numeral 25G and the same has the slot means 32G formed therein and each defining a transverse surface 36G which extends from one end 41G thereof to the other end 37G thereof, each surface 36G defining a substantially arcuate portion 40G which presents a convex side or line against which the band means 24'G has its surface 42G engaged throughout the entire transverse length thereof.

In this manner, it is believed that because the arcuate transverse surface 36G is progressively higher as it extends from the end 41G thereof toward the central stem 33G of the belt element 25G, such surface 40G will bias the band means 24G toward the central stem 33G for the same reasons that the substantially straight line transverse surfaces 36 bias their respective band means 24' toward the central stems 33 of the belt elements 25 previously described.

Figure 13:
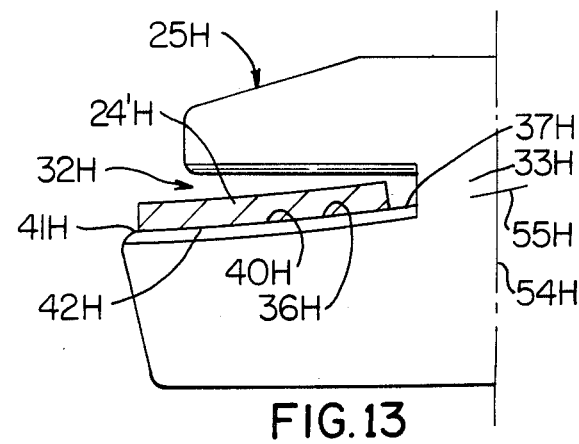
FIG. 13 is a view similar to FIG. 12 and illustrates another belt element of this invention.

As illustrated in FIG. 13, the belt element 25H has the slot means 32H defining the transverse surface 36H with the substantially arcuate portion 40H thereof extending from the end 41H to the apex 37H and being progressively higher as it extends from the end 41H to the apex 37H even though the surface portion 40H defines a concave configuration engaging against the undersurface 42H of the band means 24'H that is disposed in the slot means 32H.

It is believed that the concave portion 40H will still bias the band means 24'H toward the central stem 33H for the reasons previously set forth.

If desired, the convex transverse portion 40G of the belt element 25G can be described by an arc that would cross the center line 54 of the belt element 25G at a point 55 which is higher than the apex 37G to insure that each portion of the part 40G will be progressively higher as it proceeds toward the central stem 33G. Similarly, the concave portion 40H of the belt element 25H can be defined by an arc which will cross the center line 54H of the belt element 25H at the point 55H which is higher than the apex 37H to insure that each point on the portion 40H will be progressively higher as the point proceeds from the end 41H thereof to the apex end 37H thereof.

Figure 17:
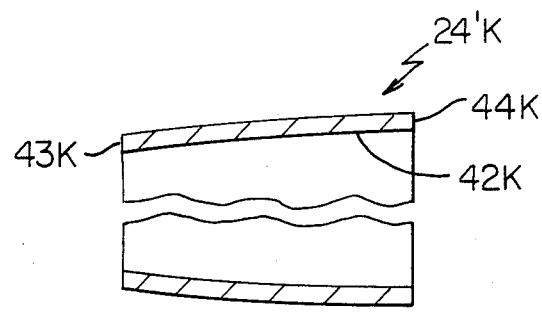
FIG. 17 is a view similar to FIG. 16 and illustrates another band means of this invention.
Figure 18:
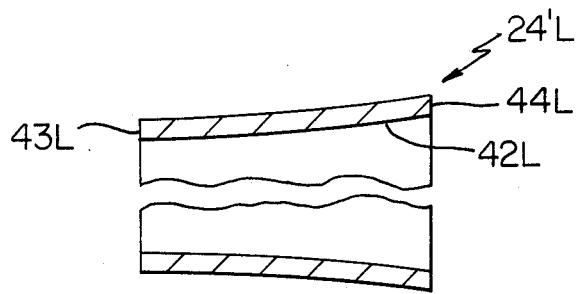
FIG. 18 is a view similar to FIG. 17 and illustrates another band means of this invention.

While the band means 24'G and 24'H utilized with the belt elements 25G and 25H can each respectively define a substantially cylindrical configuration before being assembled with the belt elements 25G and 25H, the band means 24'G or 24'H could be the same as the conical band means 24'A illustrated in FIG. 16 or the same could have an arcuate cross-sectional configuration as illustrated respectively by the band means 24'K and 24'L in FIGS. 17 and 18.

In particular, it can be seen that the band means 24'K in FIG. 17 has an inside surface 42K that progressively becomes higher as the same extends from the end 43K thereof to the end 44K thereof while being concave whereas the inner surface 42L of the band means 24'L presents a convex inwardly facing surface that extends from the smaller edge 43L thereof to the larger edge 44L thereof whereby the band means 24'K and 24'L will respectively complement the arcuate transverse surfaces 36G and 36H of the belt elements 25G and 25H when assembled therewith in the same manner that the conical band means 24'A complemented the surfaces 36 of the belt elements 25.

Figure 14:
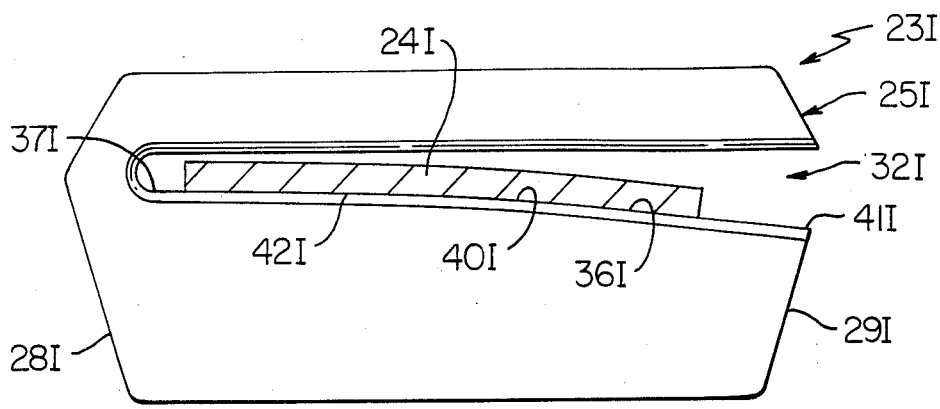
FIG. 14 is a view similar to FIG. 10 and illustrates another belt element of this invention.
Figure 15:
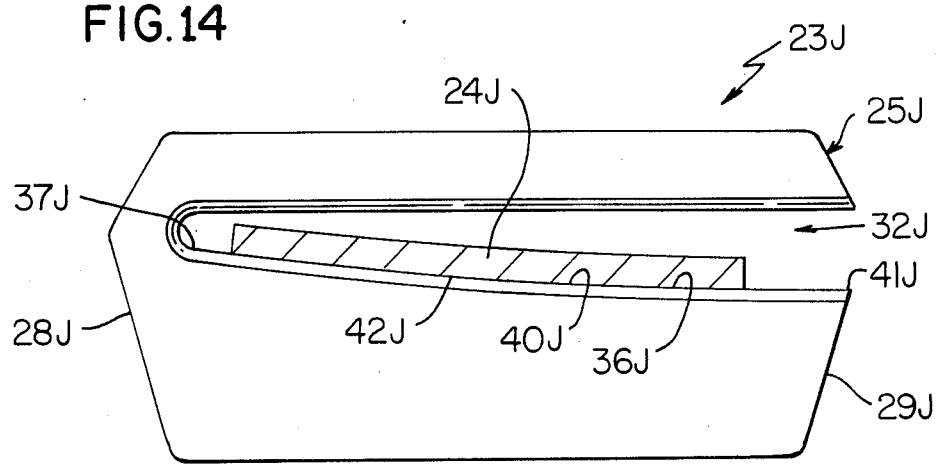
FIG. 15 is a view similar to FIG. 10 and illustrates another belt element of this invention.

Also, while the band means 24'K and 24'L are described for use with the surfaces 36G and 36H of the respective elements 25G and 25H, such band means 24'K and 24'L could be used with the respective belt elements 25I and 25J of FIGS. 14 and 15 of this invention wherein, in a manner similar to FIG. 10, only single slot means 32I and 32J are provided which respectively define a convex arcuate surface portion 40I and a concave surface portion 40J in the same manner as provided by the arcuate surface portions 40G and 40H.

Therefore, it can be seen that each of the belt elements of this invention previously described and illustrated has at least one slot means receiving at least part of a band means therein, the slot means defining a shoulder engaging the part of the band means with the shoulder having a transverse surface that has at least a portion that engages its respective part of the band means from substantially one end of that portion to substantially the other end thereof. Such portion of the transverse surface of each belt element is disposed progressively higher as it extends from one of the ends thereof to the other end thereof whereby the other end of that portion comprises the apex of that portion.

Accordingly, it can be seen that this invention not only provides an improved belt construction for a continuously variable transmission and method of making the same, but also this invention provides an improved belt element for such a belt construction and a method of making such a belt element.

While the forms and method steps of this invention now preferred have been illustrated and described as required by the Patent Statute, it is to be understood that other forms and method steps can be utilized an still fall within the scope of the appended claims.

What is claimed is:

1. In a belt construction for a continuously variable transmission, said belt construction having an endless flexible band means, and a plurality of belt elements carried by said band means in sliding relation therewith, each belt element having slot means receiving said band means therein and having opposed faces disposed in compressed relation against adjacent faces of adjacent belt elements, each belt element having opposed sides for respectively engaging pulley faces of said transmission, said slot means for each belt element defining a pair of slots respectively interrupting said opposed sides thereof and being spaced from each other by a central stem portion of said element, said pair of slots for each element receiving parts of said band means therein and respectively defining a pair of shoulders engaging said parts of said band means, each shoulder of each belt element having a transverse surface provided with an apex that engages its respective part of said band means, said apex of each transverse surface of its respective belt element being offset relative to the center between its respective side and its respective central stem to tend to bias its respective part of said band means toward its respective central stem rather than toward its respective side, the improvement wherein said apex of each transverse surface of each belt element is disposed between its respective center and its respective stem.

2. A belt construction as set forth in claim 1 wherein said apex of each transverse surface of each belt element is disposed closely adjacent its respective stem.

3. A belt construction as set forth in claim 2 wherein each said part of said band means normally defines a truncated substantially conical configuration before being assembled with said belt elements with said conical configuration having a longer edge means adjacent said stems of said belt elements and a shorter edge means adjacent its respective sides of said belt elements.

4. A belt construction as set forth in claim 2 wherein said transverse surface of each shoulder of each belt element defines a substantially straight portion extending from its respective side to its respective apex and engaging its respective part of said band means throughout substantially the entire transverse length of said respective part of said band means.

5. A belt construction as set forth in claim 2 wherein said transverse surface of each shoulder of each belt element defines a substantially arcuate portion extending from its respective side to its respective apex and engaging its respective part of said band means throughout substantially the entire transverse length of said respective part of said band means.

6. A belt construction as set forth in claim 5 wherein said arcuate portion of each transverse surface of each belt element is disposed progressively higher as it extends from its respective side to its respective apex.

7. A belt construction as set forth in claim 6 wherein said arcuate portion of each transverse surface of each belt element is convex between its respective side and its respective apex.

8. A belt construction as set forth in claim 6 wherein said arcuate portion of each transverse surface of each belt element is concave between its respective side and its respective apex.

9. In a belt element for a belt construction for a continuously variable transmission wherein said belt construction has an endless flexible band means and a plurality of said belt elements carried by said band means in sliding relation therewith, said belt element having slot means for receiving said band means therein and having opposed faces adapted to be disposed in compressed relation against adjacent faces of adjacent belt elements, said belt element having opposed sides for respectively engaging pulley faces of said transmission, said slot means for said belt element defining a pair of slots respectively interrupting said opposed sides thereof and being spaced from each other by a central stem portion of said element, said pair of slots for said element being adapted to receive parts of said band means therein and respectively defining a pair of shoulders for engaging said parts of said band means, each shoulder of said belt element having a transverse surface provided with an apex that is adapted to engage its respective part of said band means, said apex of each transverse surface of said belt element being offset relative to the center between its respective side and said central stem to tend to bias its respective part of said band means toward said central stem rather than toward its respective side, the improvement wherein said apex of each transverse surface is disposed between its respective center and said stem.

10. A belt element as set forth in claim 9 wherein said apex of each transverse is disposed closely adjacent said stem.

11. A belt element as set forth in claim 10 wherein said transverse surface of each shoulder defines a substantially straight portion extending from its respective side to its respective apex and being adapted to engage its respective part of said band means throughout substantially the entire transverse length of said respective part of said band means.

12. A belt element as set forth in claim 10 wherein said transverse surface of each shoulder defines a substantially arcuate portion extending from its respective side to its respective apex and being adapted to engage its respective part of said band means throughout substantially the entire transverse length of said respective part of said band means.

13. A belt element as set forth in claim 12 wherein said arcuate portion of each transverse surface is disposed progressively higher as it extends from its respective side to its respective apex.

14. A belt element as set forth in claim 13 wherein said arcuate portion of each transverse surface is convex between its respective side and its respective apex.

15. A belt element as set forth in claim 13 wherein said arcuate portion of each transverse surface is concave between its respective side and its respective apex.

16. In a method of making a belt construction for a continuously variable transmission, said belt construction having an endless flexible band means, and a plurality of belt elements carried by said band means in sliding relation therewith, each belt element having slot means receiving said band means therein and having opposed faces disposed in compressed relation against adjacent faces of adjacent belt elements, each belt element having opposed sides for respectively engaging pulley faces of said transmission, said slot means for each belt element defining a pair of slots respectively interrupting said opposed sides thereof and being spaced from each other by a central stem portion of said element, said pair of slots for each element receiving parts of said band means therein and respectively defining a pair of shoulders engaging said parts of said band means, each shoulder of each belt element having a transverse surface provided with an apex that engages its respective part of said band means, said apex of each transverse surface of its respective belt element being offset relative to the center between its respective side and its respective central stem to tend to bias its respective part of said band means toward its respective central stem rather than toward its respective side, the improvement comprising the step of forming said apex of each transverse surface of each belt element to be disposed between its respective center and its respective stem.

17. A method of making a belt construction as set forth in claim 16 wherein said step of forming said apex of each transverse surface of each belt element causes each apex to be disposed closely adjacent its respective stem.

18. A method of making a belt construction as set forth in claim 17 and including the step of forming each said part of said band means to normally define a truncated substantially conical configuration before being assembled with said belt elements so that said conical configuration has a longer edge means adjacent said stems of said belt elements and a shorter edge means adjacent its respective sides of said belt elements.

19. A method of making a belt construction as set forth in claim 17 and including the step of forming said transverse surface of each shoulder of each belt element to define a substantially straight portion extending from its respective side to its respective apex and engaging its respective part of said band means throughout substantially the entire transverse length of said respective part of said band means.

20. A method of making a belt construction as set forth in claim 17 and including the step of forming said transverse surface of each shoulder of each belt element to define a substantially arcuate portion extending from its respective side to its respective apex and engaging its respective part of said band means throughout substantially the entire transverse length of said respective part of said band means.

21. A method of making a belt construction as set forth in claim 20 wherein said step of forming said arcuate portion of each transverse surface of each belt element causes each arcuate portion to be disposed progressively higher as it extends from its respective side to its respective apex.

22. A method of making a belt construction as set forth in claim 21 wherein said step of forming said arcuate portion of each transverse surface of each belt element causes each arcuate portion to be convex between its respective side and its respective apex.

23. A method of making a belt construction as set forth in claim 21 wherein said step of forming said arcuate portion of each transverse surface of each belt element causes each arcuate portion to be concave between its respective side and its respective apex.

24. In a method of making a belt element for a belt construction for a continuously variable transmission wherein said belt construction has an endless flexible band means and a plurality of said belt elements carried by said band means in sliding relation therewith, said belt element having slot means for receiving said band means therein and having opposed faces adapted to be disposed in compressed relation against adjacent faces of adjacent belt elements, said belt element having opposed sides for respectively engaging pulley faces of said transmission, said slot means for said belt element defining a pair of slots respectively interrupting said opposed sides thereof and being spaced from each other by a central stem portion of said element, said pair of slots for said element being adapted to receive parts of said band means therein and respectively defining a pair of shoulders for engaging said parts of said band means, each shoulder of said belt element having a transverse surface provided with an apex that is adapted to engage its respective part of said band means, said apex of each transverse surface of said belt element being offset relative to the center between its respective side and said central stem to tend to bias its respective part of said band means toward said central stem rather than toward its respective side, the improvement comprising the step of forming said apex of each transverse surface to be disposed between its respective center and said stem.

25. A method of making a belt element as set forth in claim 24 wherein said step of forming said apex of each transverse surface of said belt element causes each apex to be disposed closely adjacent said stem.

26. A method of making a belt element as set forth in claim 25 and including the step of forming said transverse surface of each shoulder of said belt element to define a substantially straight portion extending from its respective side to its respective apex and being adapted to engage its respective part of said band means throughout substantially the entire transverse length of said respective part of said band means.

27. A method of making a belt element as set forth in claim 25 and including the step of forming said transverse surface of each shoulder of said belt element to define a substantially arcuate portion extending from its respective side to its respective apex and being adapted to engage its respective part of said band means throughout substantially the entire transverse length of said respective part of said band means.

28. A method of making a belt element as set forth in claim 27 wherein said step of forming said arcuate portion of each transverse surface of said belt element causes each arcuate portion to be disposed progressively higher as it extends from its respective side to its respective apex.

29. A method of making a belt element as set forth in claim 28 wherein said step of forming said arcuate portion of each transverse surface of said belt element causes each arcuate portion to be convex between its respective side and its respective apex.

30. A method of making a belt element as set forth in claim 28 wherein said step of forming said arcuate portion of each transverse surface of said belt element causes each arcuate portion to be concave between its respective side and its respective apex.

31. In a belt construction for a continuously variable transmission, said belt construction having an endless flexible band means, and a plurality of belt elements carried by said band means in sliding relation therewith, each belt element having at least one slot means receiving at least part of said band means therein and having opposed faces disposed in compressed relation against adjacent faces of adjacent belt elements, each belt element having opposed sides for respectively engaging pulley faces of said transmission, said slot means for each element defining a shoulder engaging said part of said band means, said shoulder of each belt element having a transverse surface that has at least a portion that engages its respective part of said band means from substantially one end of said portion to substantially the other end thereof, the improvement wherein said portion of each transverse surface of its respective belt element is disposed progressively higher as it extends from one of said ends thereof to the other end thereof whereby said other end of each portion comprises the apex of that said portion.

32. A belt construction as set forth in claim 31 wherein said portion of said shoulder of each belt element is substantially straight between said ends thereof.

33. A belt construction as set forth in claim 31 wherein said portion of said shoulder of each belt element is substantially arcuate between said ends thereof.

34. A belt construction as set forth in claim 33 wherein said arcuate portion of said surface of each belt element is convex between said ends thereof.

35. A belt construction as set forth in claim 33 wherein said arcuate portion of said surface of each belt element is concave between said ends thereof.

36. In a belt element for a belt construction for a continuously variable transmission wherein said belt construction has an endless flexible band means and a plurality of said belt elements carried by said band means in sliding relation therewith, said belt element having at least one slot means for receiving at least part of said band means therein and having opposed faces adapted to be disposed in compressed relation against adjacent faces of adjacent belt elements, said belt element having opposed sides for respectively engaging pulley faces of said transmission, said slot means for said belt element defining a shoulder for engaging said part of said band means, said shoulder of said belt element having a transverse surface that has at least a portion that is adapted to engage its respective part of said band means from substantially one end of said portion to substantially the other end thereof, the improvement wherein said portion of said transverse surface is disposed progressively higher as its extends from one of said ends thereof to the other end thereof whereby said other end of said portion comprises the apex of said portion.

37. A belt element as set forth in claim 36 wherein said portion of said shoulder of said belt element is substantially straight between said ends thereof.

38. A belt element as set forth in claim 36 wherein said portion of said shoulder of said belt element is substantially arcuate between said ends thereof.

39. A belt element as set forth in claim 38 wherein said arcuate portion of said surface of said belt element is convex between said ends thereof.

40. A belt element as set forth in claim 38 wherein said arcuate portion of said surface of said belt element is concave between said ends thereof.

41. In a method of making a belt construction for a continuously variable transmission, said belt construction having an endless flexible band means, and a plurality of belt elements carried by said band means in sliding relation therewith, each belt element having at least one slot means receiving at least part of said band means therein and having opposed faces disposed in compressed relation against adjacent faces of adjacent belt elements, each belt element having opposed sides for respectively engaging pulley faces of said transmission, said slot means for each element defining a shoulder engaging said part of said band means, said shoulder of each belt element having a transverse surface that has at least a portion that engages its respective part of said band means from substantially one end of said portion to substantially the other end thereof, the improvement comprising the step of forming said portion of each transverse surface of its respective belt element to be disposed progressively higher as it extends from one of said ends thereof to the other end thereof whereby said other end of each portion comprises the apex of that said portion.

42. A method of making a belt construction as set forth in claim 41 and including the step of forming said portion of said shoulder of each belt element to be substantially straight between said ends thereof.

43. A method of making a belt construction as set forth in claim 41 and including the step of forming said portion of said shoulder of each belt element to be substantially arcuate between said ends thereof.

44. A method of making a belt construction as set forth in claim 43 wherein said step of forming said arcuate portion of said shoulder of each belt element causes each arcuate portion to be convex between said ends thereof.

45. A method of making a belt construction as set forth in claim 43 wherein said step of forming said arcuate portion of said shoulder of each belt element causes each arcuate portion to be concave between said ends thereof.

46. In a method of making a belt element for a belt construction for a continuously variable transmission wherein said belt construction has an endless flexible band means and a plurality of said belt elements carried by said band means in sliding relation therewith, said belt element having at least one slot means for receiving at least part of said band means therein and having opposed faces adapted to be disposed in compressed relation against adjacent faces of adjacent belt elements, said belt element having opposed sides for respectively engaging pulley faces of said transmission, said slot means for said element being adapted to engage said part of said band means, said shoulder of said belt element having a transverse surface provided with at least a portion that is adapted to engage its respective part of said band means from substantially one end of said portion to substantially the other end thereof, the improvement comprising the step of forming said portion of said transverse surface to be disposed progressively higher as it extends from one of said ends thereof to the other end thereof whereby said other end of said portion comprises the apex of said portion.

47. A method of making a belt element as set forth in claim 46 and including the step of forming said portion of said shoulder of said belt element to be substantially straight between said ends thereof.

48. A method of making a belt element as set forth in claim 46 and including the step of forming said portion of said shoulder of said belt element to be substantially arcuate between said ends thereof.

49. A method of making a belt element as set forth in claim 48 wherein said step of forming said arcuate portion of said shoulder of said belt element causes said arcuate portion to be convex between said ends thereof.

50. A method of making a belt element as set forth in claim 48 wherein said step of forming said arcuate portion of said shoulder of said belt element causes said arcuate portion to be concave between said ends thereof.

51. A belt construction as set forth in claim 31 wherein said part of said band means comprises an endless band that has an inside surface that engages said portion of each transverse surface of its respective belt element and has opposed ends one of which is adjacent said one end of each belt element and the other of which is adjacent said other end of each belt element, said band when not assembled with said belt elements defining a truncated conical section with said one end thereof defining a circle and the other end thereof defining a circle that is larger in diameter than said circle defined by said one end thereof.

52. A belt construction as set forth in claim 51 wherein said inside surface of said band when not assembled with said belt elements has a transverse cross-sectional configuration that is substantially straight between said ends thereof.

53. A belt construction as set forth in claim 51 wherein said inside surface of said band when not assembled with said belt elements has a transverse cross-sectional configuration that is substantially arcuate between said ends thereof.

54. A belt construction as set forth in claim 51 wherein said inside surface of said band when not assembled with said belt elements has a transverse cross-sectional configuration that is substantially convex between said ends thereof.

55. A belt construction as set forth in claim 51 wherein said inside surface of said band when not assembled with said belt elements has a transverse cross-sectional configuration that is substantially concave between said ends thereof.

56. A method of making a belt construction as set forth in claim 41 and including the steps of forming said part of said band means to comprise an endless band that has an inside surface that engages said portion of each transverse surface of its respective belt element and has opposed ends one of which is adjacent said one end of each belt element and the other of which is adjacent said other end of each belt element, and forming said band so that when said band is not assembled with said belt elements said band defines a truncated conical section with said one end thereof defining a circle and the other end thereof defining a circle that is larger in diameter than said circle defined by said one end thereof.

57. A method of making a belt construction as set forth in claim 56 and including the step of forming said inside surface of said band to have a transverse cross-sectional configuration that is substantially straight between said ends thereof when said band is not assembled to said belt elements.

58. A method of making a belt construction as set forth in claim 56 and including the step of forming said inside surface of said band to have a transverse cross-sectional configuration that is substantially arcuate between said ends thereof when said band is not assembled to said belt elements.

59. A method of making a belt construction as set forth in claim 56 and including the step of forming said inside surface of said band to have a transverse cross-sectional configuration that is substantially convex between said ends thereof when said band is not assembled to said belt elements.

60. A method of making a belt construction as set forth in claim 56 and including the step of forming said inside surface of said band to have a transverse cross-sectional configuration that is substantially concave between said ends thereof when said band is not assembled to said belt elements.

* * * * *